United States Patent
Maugg

[15] 3,664,106
[45] May 23, 1972

[54] MANIPULATING WHEEL FOR A HAY OR CROP COLLECTING TURNING OR TREATING MACHINE

[72] Inventor: Josef Maugg, Glarus, Switzerland

[73] Assignee: Maschinenfabrik Fahr A.G., Gottmadingen, Germany

[22] Filed: Aug. 11, 1969

[21] Appl. No.: 848,879

[30] Foreign Application Priority Data

Aug. 13, 1968 Germany.....................P 17 82 308.4
June 9, 1969 Germany.....................P 19 29 104.4

[52] U.S. Cl. ............................................................56/370
[51] Int. Cl. .......................................................A01d 79/00
[58] Field of Search..................................56/365–371, 375, 56/377, 295, 370

[56] References Cited

UNITED STATES PATENTS 3,184,907   5/1965   Harloff...................................56/295
3,527,040   9/1970   Teagle....................................56/370

FOREIGN PATENTS OR APPLICATIONS 1,118,209   6/1968   Great Britain...........................56/370
439,844   12/1967   Switzerland............................56/370

Primary Examiner—Louis G. Mancene
Assistant Examiner—J. N. Eskovitz
Attorney—Ernest F. Marmorek

[57] ABSTRACT

In a hay manipulating machine, a manipulating wheel supported from the ground by a support wheel and rotatable about an axis, operating prong means having a rest and an operating position being coupled to the manipulating wheel in a manner that they assume the rest position when the manipulating wheel is in rest position and they assume the operating position when the manipulating wheel is rotated about its axis.

25 Claims, 18 Drawing Figures

MANIPULATING WHEEL FOR A HAY OR CROP COLLECTING TURNING OR TREATING MACHINE

FIELD OF THE INVENTION

The present invention relates to a manipulating wheel for hay manipulating or treating machines, more particularly, it relates to a manipulating wheel which is mounted for rotation and which on its spokes or rim portions carries a plurality of operating or scattering prongs or catch prongs.

BACKGROUND OF THE INVENTION

The prongs of a manipulating wheel in a hay manipulating or treating machine are exposed to extremely high loads during the collection, manipulating or scattering of crops, such as hay, and thereby many times damaged when the wheel with its prongs comes into engagement with obstructions, such as stones, roots, etc. It has been known, in order to avoid the above described damages, to make the operating prongs from spring steel or to mount them in a spring spoke allowing deflection inwardly toward the axis of rotation. Such measures, however, do not provide sufficient protection against damages caused by objects hit by the prongs, since they are too stiff and, despite their spring construction, not deflectable enough. Furthermore, notwithstanding the spring like construction of the prongs, it is impossible to adjust them to a steady level with respect to the ground which fact results in damages to the grass surface.

SUMMARY OF THE INVENTION

It is, therefore, an object of the present invention to provide an improved manipulating wheel for a hay or crop manipulating machine which lacks the above described shortcomings of the operating or manipulating wheels.

It is another object of the present invention to provide an improved manipulating wheel for a hay collecting, manipulating or treating machine, which at relatively small construction costs is capable of following the varying ground levels without damaging the grass, and which is capable of adjusting itself to or follow the ground inequalities.

It is a further object of the present invention to provide an improved manipulating wheel for a hay machine, in which the operating or manipulating prongs are stabilized in their operating position.

With view of the above objects, the invention provides that the operating or manipulating prongs of the manipulating wheel are mounted on the spokes or rim portions of the wheel in a rotatable fashion and assume their operating position due to the centrifugal forces developed during the rotation of the wheel and against the force of retracting springs operating on the prongs and which springs retract such prongs in a rest position away from the ground when the operating wheel stops in its rotation.

The pivotable support of the operating prongs is provided by means of a coupling bolt placed into or formed from the spoke or placed into the rim portion of the wheel, and if such bolt is fixed with respect to the spokes or the rim portion, then the prongs are rotatably mounted thereon, or if it is rotatable with respect to the spokes or the rim portion, then the prongs are fixedly mounted thereon. In order to retain the operating prongs in their rest position, at least one spring is provided for each operating prong which directly operates on the prongs, or if they are mounted on an intermediate member, then operates on the intermediate member.

According to the invention, the operating prongs may be mounted on an intermediate member which is joined to the wheel through a bolt-like shaft and also that the operating prongs may be set at a desired operating angle on such intermediate member.

The bolt-like joint or shaft associated with the prongs and providing their coupling or the coupling of the intermediate member to the wheel or to the rim portion may be mounted parallel or at an angle with respect to the axis of rotation of the wheel, whereby in the rest position, it becomes possible to further lift the prongs off the ground toward the axis of rotation of the wheel. In one particular embodiment, such joining shaft may be mounted substantially perpendicular to the axis of rotation of the manipulating wheel and set in the spoke of the wheel or in its rim portion.

The operating prongs according to the invention are provided with flyweights slidably mounted in order to aid the prongs to assume their operating position faster and to stabilize them in such operating position during the rotation of the manipulating wheel.

The invention also provides a further coupling for the operating prongs enabling pivoting in the vertical direction with respect to the ground and coupling them with the spoke or with the rim portion of the operating wheel. In such embodiment guide surfaces or cam surfaces are provided in the region of the deflection of the prongs which, when the retracting springs cause the prongs to retrack inwardly, will cause the prongs to deflect also in the vertical direction while returning into their rest position.

The operating or manipulating wheel constructed according to the present invention with its operating prongs will not be exposed to extreme requirements during its operation since, due to the slidable mounting of the prongs in the direction of the axis of rotation of the wheel, they can retract or deflect easily upon coming into contact with any of the above mentioned obstructions. Such elastic mounting of the prongs prevents them from becoming damaged by inequalities in the ground.

According to the above construction of the operating or manipulating wheel of the hay manipulating machine, the operating prongs assume their operating position with the centrifugal forces developed during the rotation of the wheel so that the operating wheel before its rotation does not have to be set into a particular operating position or, after finishing the work, the operating wheel does not have to be set into a particular transport position since the operating prongs are retracted into a rest position under the influence of the associated springs, such retracted position resulting in a reduced diameter of the operating wheel and thereby in a substantial distance between the retracted prongs and the ground. As a result, rational and simplified operating conditions are created which require nothing more than setting the manipulating wheel into rotation or stopping it in its rotation.

The invention also provides for the stabilization of the operating prongs in their operating position by means of an adjustable device with which the prongs or the flyweights cooperate.

Such stabilizing device according to the invention can be in the form of a curved rail which in the operating position cooperates either with the springs or with a projection provided on the wheel.

According to another embodiment of the invention, such stabilizing device can be made in the form of adjustable bolts set in the wheel against which the operating prongs or the associated flyweights abut during the operating position.

Further in accordance with the invention, such stabilizing device can be in the form of a catch surface provided on the flyweights mounted in slidable fashion cooperating with the prongs, which then cooperates with a corresponding surface or recess provided on the operating prongs or on an intermediate member carrying such prongs.

The invention provides in another embodiment thereof that the stabilizing or arresting device for the operating prongs is in the form of a slidably mounted sleeve provided on the spokes of the wheel, which then carries catch surfaces cooperating with corresponding surfaces on the prongs or on the intermediate members carrying the prongs and engages them when such sleeve is driven to an extreme position while at the same time the prongs are driven by the centrifugal force to their operating position.

By providing a pair of manipulating wheels according to the invention on a cross support in a hay manipulating machine, it becomes possible to perform all operations customary in connection with hay or crop treating or manipulating at a high speed. It is preferable that in a machine using the wheels according to the present invention, the wheels to be mounted in such a fashion that the operating prongs of adjacent wheels enter each other's region in a comb-like fashion or that the operating circular regions of the prongs of adjacent wheels are tangential or overlap each other. Also, according to the invention, the adjacent manipulating wheels may be driven in the same rotational sense or in the opposite sense. Also, the manipulating wheels may be mounted directly next to each other or in an offset fashion with respect to the direction of travelling.

The invention also provides that a single manipulating wheel supported by a pair of supporting wheels from the ground could be used as hay manipulating machine itself.

BRIEF DESCRIPTION OF THE DRAWINGS

The invention will become more readily apparent from the following description of preferred embodiments thereof shown in the accompanying drawings, in which.

DESCRIPTION OF THE PREFERRED EMBODIMENTS

Figure 1:
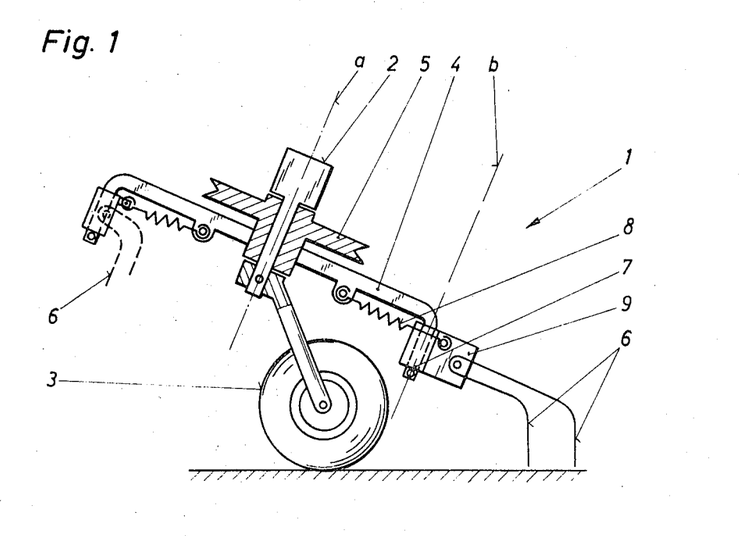
FIG. 1 is the side view, partly in section, of a hay-machine wheel having tiltably or pivotably mounted operating prongs.
Figure 2:
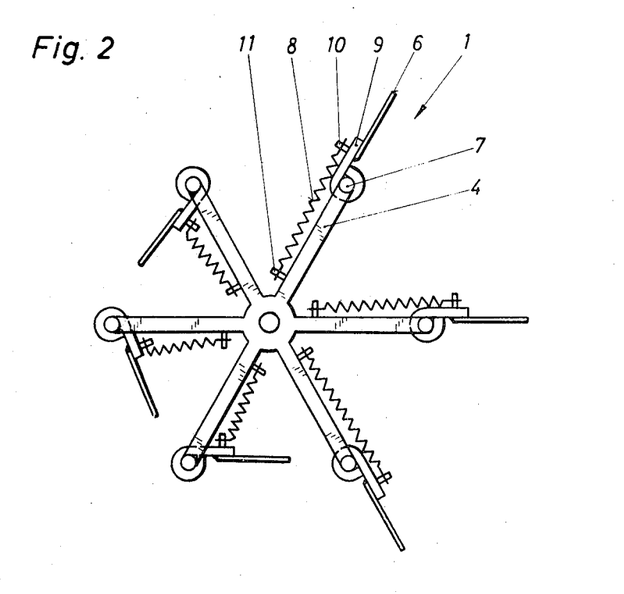
FIG. 2 is top view of the wheel according to FIG. 1.

With reference to FIGS. 1 and 2 it is seen that the hay machine wheel 1 is rotated while being supported on a support member 2, which in turn is coupled to a driving machine not shown. Wheel 1 includes a hub which for coupling purposes is in the form of a V-belt drive, and spokes 4 on which the operating prongs 6 are disposed nearly in a perpendicular direction. For supporting the hay machine wheel 1 on the ground a supporting wheel 3 is coupled to support member 2.

The operating prongs 6 which perform the hay manipulating operations and, as more particularly can be seen in FIG. 2, are journalled on spoke 4 in a tiltable manner, particularly on a downwardly pointed portion of the spokes. Such downwardly pointed portion of the spokes is in the form of a bolt 7 on which intermediate members 9 are pivotably disposed and on which, in turn, the prongs 6 are supported rotatably due to the rotatable positioning of intermediate member 9 on bolt portion 7 of the spokes. In order to support prongs 6 in an operative position which is shown with the dashed line in FIG. 1, springs 8 are provided, which with one of their ends are secured to intermediate members 9 by pins 10 and with their other ends are secured to spokes 4 of the wheel 1 by pins 11. Pins 10 are disposed on intermediate members 9 and are located at such a distance from pivot axis b about which the prongs can rotate, that springs 8 will always provide a pulling force and, as a result of which, prongs 6 are pulled in the direction of the axis of rotation a of wheel 1 which is directed parallel with respect to pivot axis b.

When wheel 1 becomes driven through the V-belt drive 5 from a tractor or driving unit coupled to support member 2 and starts to rotate, then the resulting centrifugal forces will cause the prongs to be automatically extended into their operational position against the pulling force of the springs 8 as seen in the right side of FIGS. 1 and 2. Should then under these conditions the prongs or some of them engage an irregularity of the ground, such as roots, a rock or a ground-projection, then such prongs coming into engagement with such object, become elastically deflected due to their elastic journalling, such deflection being in the inward and upward direction, whereupon damages to prongs 6 are avoided or the freshly cut grass or ground surface will not be damaged. Upon finishing the hay manipulating operation, it is necessary to disconnect the operating wheel 1 from the driving unit in order to retract prongs 6 in their inoperative or travelling position. As a result of the force of springs 8, prongs 6 become pivoted inwardly and upwardly toward the axis of rotation a as seen on the left side of FIG. 2 so that operating wheel 1 becomes substantially reduced in its diameter and the wheel becomes adapted to be transported through regular street traffic.

Figure 3:
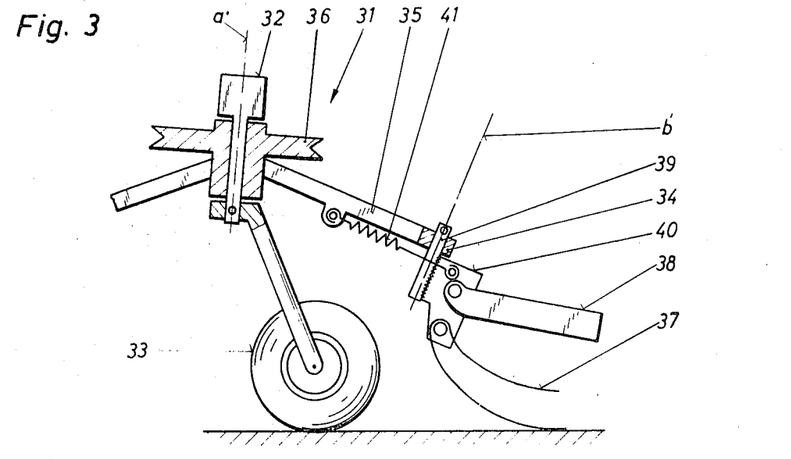
FIG. 3 is another embodiment, similar in view to FIG. 1, of a hay machine wheel.

The operating wheel 31 shown partly in FIG. 3 and which is also rotatably supported on a support member 32 in a rotatable fashion and on a supporting wheel 33 on the ground, includes prongs 37 which are horizontally directed as well as cam plates 38 serving also as operating prongs and taking part in the manipulation of the crop. Prongs 37 and the cam plates 38 are both supported on intermediate member 40 which is rotatably mounted at the bolt like end 34 of spokes 35 driven by the V-belt drive 36 of the hub member of wheel 31. Springs 41 here are also provided to put the prongs 37 and the cam plates 38 in their inoperative position similarly as described above in connection with the embodiments of FIGS. 1 and 2.

In the embodiment of FIG. 3, the pivoting axis b' of prongs 37 formed by bolts 39 is not parallel with the axis of rotation a' of wheel 31, but it is forming an angle with respect to such axis. By this structure it is attainable that when prongs 37 and the cam plates 38 are retracted when transferred in their inoperating position, they become lifted off the ground to a considerable distance, whereupon a safe transport of the wheel 31 is possible.

Figure 4:
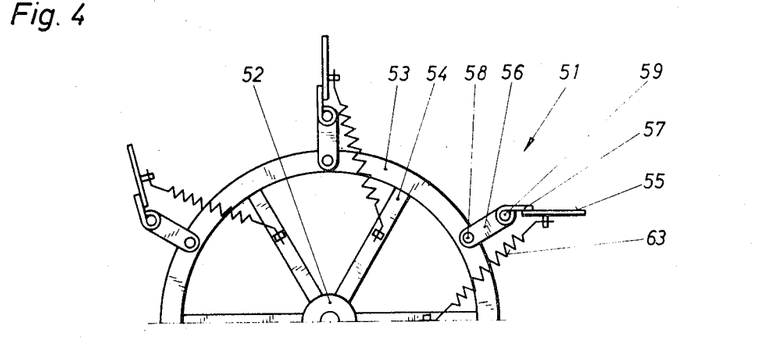
FIG. 4 illustrates the support of the operating prongs on a hay machine wheel, on an intermediate member, in top view.
Figure 5:
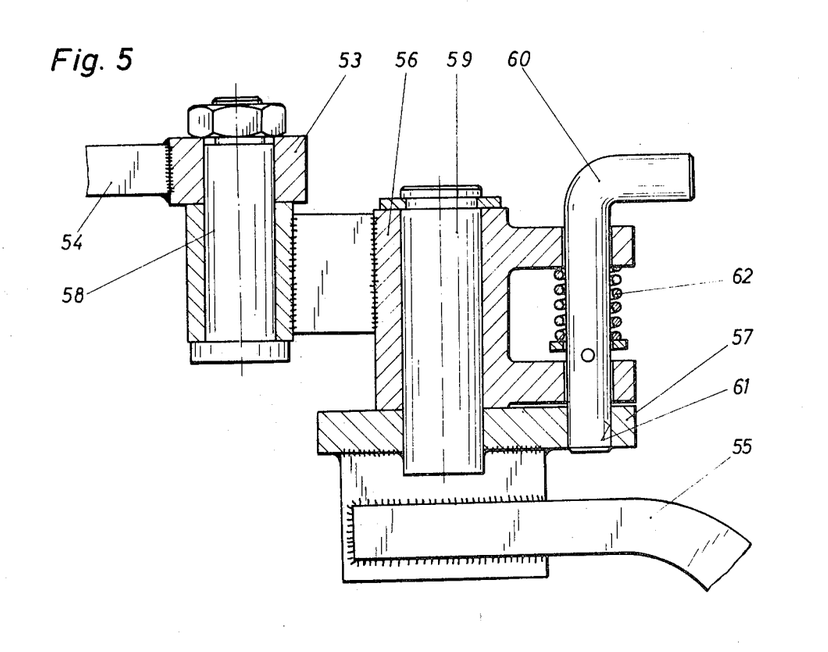
FIG. 5 illustrates in form of enlarged view with parts in section the manner in which the prongs according to FIG. 4 are supported or journaled.

The operating wheel 51 shown in FIG. 4 and, as more particularly amplified in the showing of FIG. 5, has its prongs 55 rotatably supported in rim portion 53 coupled to the spokes 54 and to hub 52, while rim portion 53 is connected to the prongs 55 through a pair of intermediate portions 56 and 57. As a result, the position of intermediate portion 57 can be variably fixed with respect to intermediate portion 57 by the provision of a stud 60 sitting in a recess 61 and operable through a spring 62. As a result, prongs 55 can be positioned at various operating angles with respect to each other, thereby they are adapted to perform a variety of hay manipulating operations.

Should then wheel 51 become driven, then intermediate members 56 will fly or pivot open about bolts 58 against the force of retracting springs 63. At the same time intermediate members 57 coupled to intermediate members 56 through bolts 59 become also pivoted to an open position by taking up or rolling into a position controlled by stud 60 after the latter assumes its position in a semi-circular recess 61. As a result, it becomes possible, as seen in FIG. 4 to set prongs 55 at any angle desired to manipulate the crop and thereby to perform various manipulating operations with this wheel.

Figure 6:
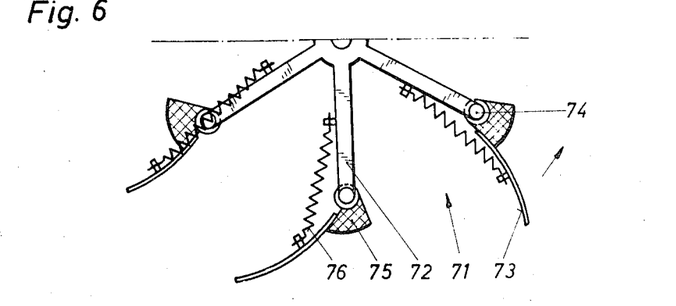
FIG. 6 illustrates in top view a hay machine wheel with its prongs provided with flyweights.

In the embodiment of an operating wheel 71 seen in FIG. 6 prongs 73 are rotatably supported on bolts 74 set in the spokes 72 and are provided with a flyweight 75. Thereby operating wheel 71 can be subjected to a less faster drive and still to obtain pivoting of prongs 73 against the force of spring 76. That is, prongs 73 operating in the manner of a fly wheel, become stabilized in their open pivoted operating position. It is obvious that the flyweights 75 can be adjusted in their weight or position according to the particular requirements to the wheel.

Figure 7:
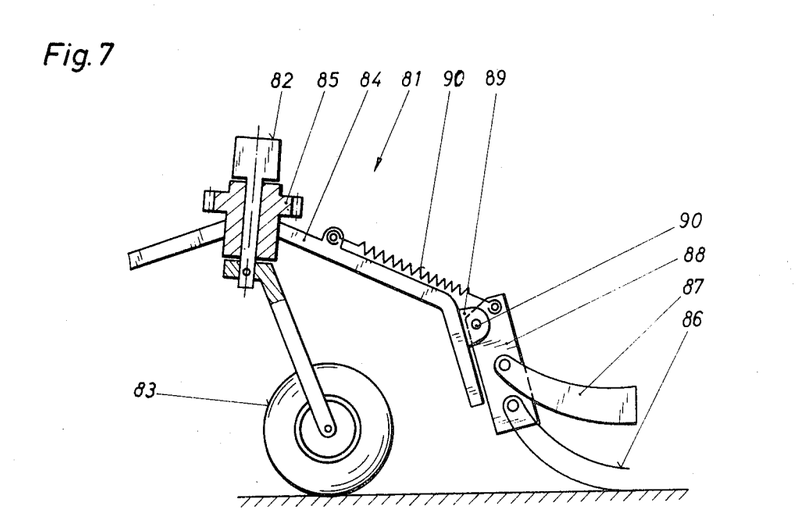
FIG. 7 is the side view of the hay machine wheel having prongs tiltable about a horizontally directed axis.

Operating prongs 86 and cam plates 87 of wheel 81 seen in FIG. 7 are pivotable about a horizontally directed axis from their operating position shown in FIG. 7. For this purpose, on spoke 84 of wheel 81 supported by wheels 83 from the ground and rotatable by the support member 82, lugs 89 provide a bearing in cooperation with bolts 90 about which the intermediate portions 88 are pivotably supported and in turn supporting operating prongs 86 and 87 thereon.

By applying rotation to wheel 81 through sprocket wheel 85, operating prongs 86, 87 as well as the intermediate portion 88 pivot outwardly and downwardly into their illustrated operating position against the force of spring 90'. As soon as the rotation of wheel 81 stops, prongs 86, 87 will be automatically retracted from the ground spring 90' so that wheel 81 is ready to be transported through traffic.

Figure 8:
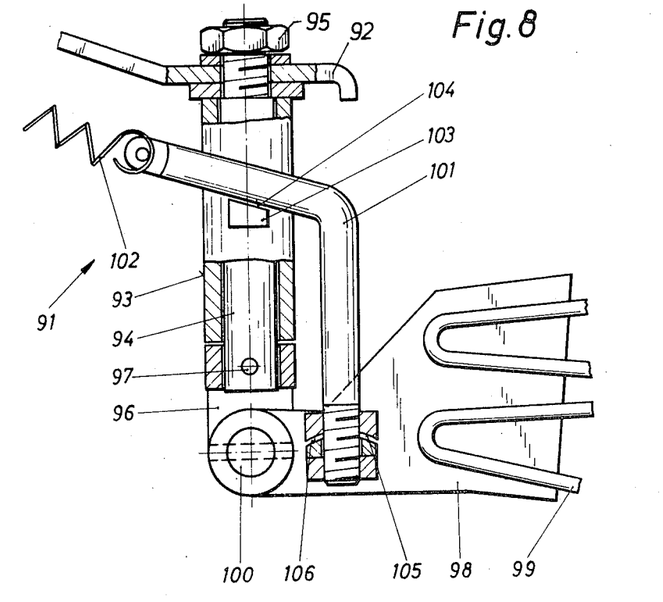
FIGS. 8-9 show the different embodiments of supporting or journaling of prongs tiltable in two planes.

Prongs 99 of wheel 91 shown partially in the embodiment of FIG. 8 are tiltable in the horizontal and in the vertical plane. For the pivotable journalling in the horizontal plane a bolt 94 is used which is rotatably supported in a sleeve 93 secured to spokes 92 of wheel 91 and by bolt 94 held in position by a nut 95. For the pivotable supporting of the prongs in the vertical plane a fork member 96 is used which is fixedly secured with bolt 94 through a pin 97. The pivotable operation itself being performed about a shaft 100 supported or journalled in the fork member 96. Shaft 100 also couples to bolt 94 in a pivotable fashion the intermediate member 98 supporting the prongs 99.

In order to accomplish an automatic pivoting of prongs 99 in both planes upon stopping of the rotation of wheel 91 by means of retracting spring 102, a pin 101 is journalled in a ball socket 105, 106 at one side of intermediate member 98. The retracting springs 102 are fixed to such pin 101 with which a projection 103 provided on sleeve 93 also cooperates. Projection 103 has a guide surface 104 against which pin 101 abuts. When pin 101 becomes pulled by the force of spring 102 in the direction of the axis of rotation of wheel 91, it becomes lifted in the manner so that prongs 99 are at the same time pivoted not only in the direction of the axis of rotation of wheel 91, but also about shaft 100 in the vertical direction.

Figure 9:
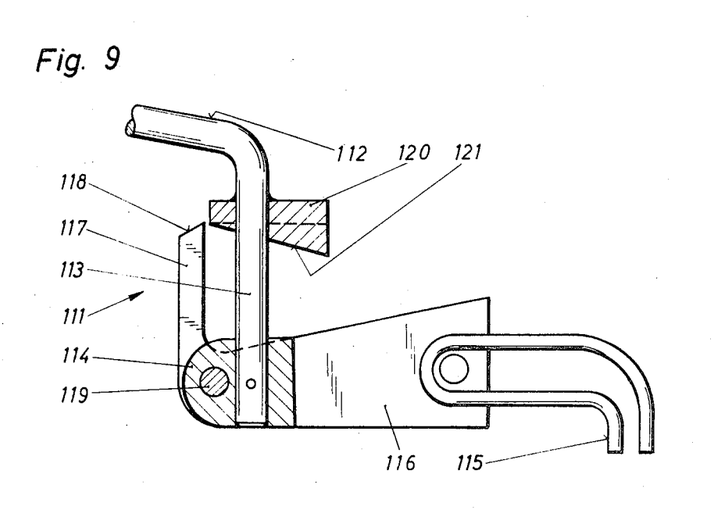

Wheel 111 shown in parts in FIG. 9 includes prongs 115 which are also pivotable in two planes by retracting springs not shown in FIG. 9. For this purpose, intermediate member 116 carrying prongs 115 is coupled pivotably with a bearing 114 through a shaft 119 and is capable of pivoting in the vertical direction, while it is journalled in the horizontal direction on the ends of spokes 112 of wheel 111 formed in the fashion of a bolt 113. In order to provide for the lifting off the prongs 115 from the ground when they are in their retracted position, there is provided a projection 117 on intermediate member 116 having a slant surface 118 at its end, surface 118 cooperates with a cam plate 120 secured to bolt 113 and being also provided with a corresponding slant surface 121.

Figure 10:
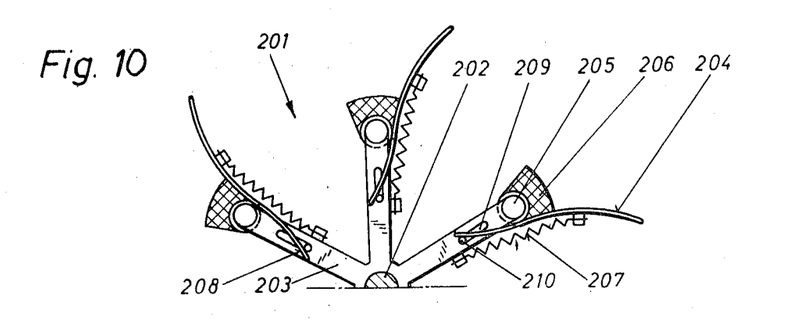
FIG. 10 shows one half of a hay machine wheel provided with means stabilizing the prongs in their operating positions.
Figure 11:
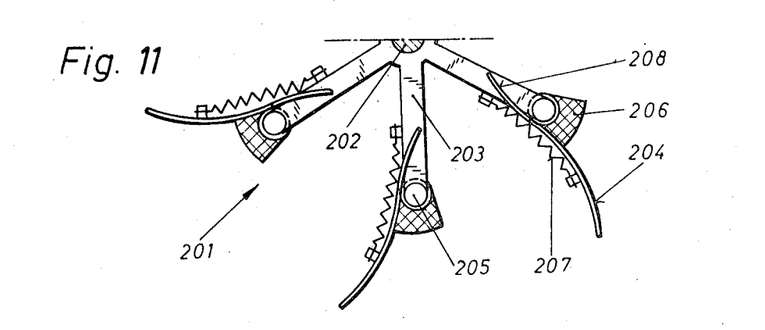
FIG. 11 is another embodiment of a wheel similar in view like in FIG. 12.

The operating wheel 201 shown in FIGS. 10 and 11 in top view, only respective halves being shown of each embodiment in both of the above mentioned figures, is rotatably supported on a support member 202 which is coupled to a driving unit or tractor not shown on the drawing. Such coupling is made through a hub portion to which a plurality of radially directed spokes 203 carrying prongs 204 are secured. Prongs 204 are in this embodiment also supported in a pivotable fashion on spokes 203 and for this purpose the downwardly directed end portion of spokes 203 is formed in the shape of a bolt or joint 205 on which prongs 204 are pivotably journalled. Prongs 204 are operated on by springs 207 which at one end of them are secured to prongs 204 while with their other end are secured to spokes 203. Each of the prongs has a flyweight 206 associated therewith.

When wheel 201 is rotated, as a result of the developing centrifugal forces, prongs 204 become automatically pivoted into their illustrated operating position against the force of springs 207. The outward pivoting process is aided by flyweight 206. In such operating position all hay manipulating operations can be performed. At the end of the operation all it is necessary to shut down the rotation of wheel 201 in order that prongs 204 be retracted in their transporting position. Namely, prongs 204 become inwardly pivoted under the force of springs 207, so that wheel 201 becomes substantially reduced in its diameter and becomes adapted for being transported without difficulty in a regular street traffic.

In order that prongs 204 could be stabilized in their operating position, a projection in the form of a curved rail 208 is provided thereon which in accordance with FIG. 10 abuts against a bolt 210 adjustably set in the elongated slot 209 provided in spokes 203. Or according to the showing of FIG. 1, it abuts against springs 207 associated with prongs 204. Should the prongs 204 engage or come across an obstruction on the ground, then they may deflect either inwardly and avoid to become damaged, then they become pivoted outwardly again due to the rotation of wheel 201. Such outward pivoting is limited by the projection 208 cooperating with bolt 210 or with spring 207. Such operating position is immediately resumed and a hunting backward is reliably prevented. Thereby operational difficulties are nearly completely eliminated.

Figure 12:
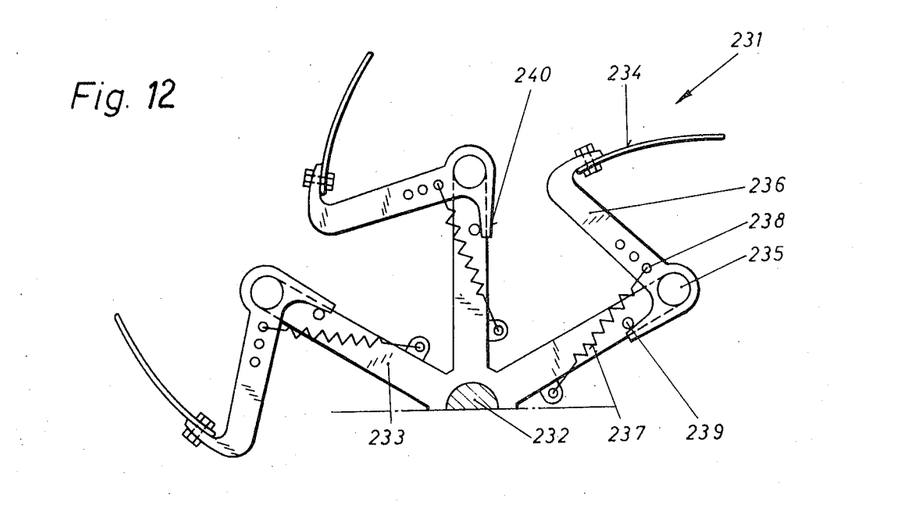
FIG. 12 is a further embodiment of the stabilizing means according to FIG. 12.

The operating wheel 231 according to FIG. 12 which is again supported on a driven support 232, has its prongs 234 secured together with flyweights 236, which are in the form of intermediate members and which in turn are rotatably journalled on bolts 235 of spokes 233. As a projection serving for stabilization of prongs 234 in their operational position, a rail 240 is provided on intermediate portions 236 which cooperates with a bolt 239 set in spoke 233 of wheel 231. By means of spring 237 which can be hooked in different apertures 238 giving a different distance from the pivot axis of the intermediate member 236, prongs 234 are brought into their inoperative position.

Figure 13:
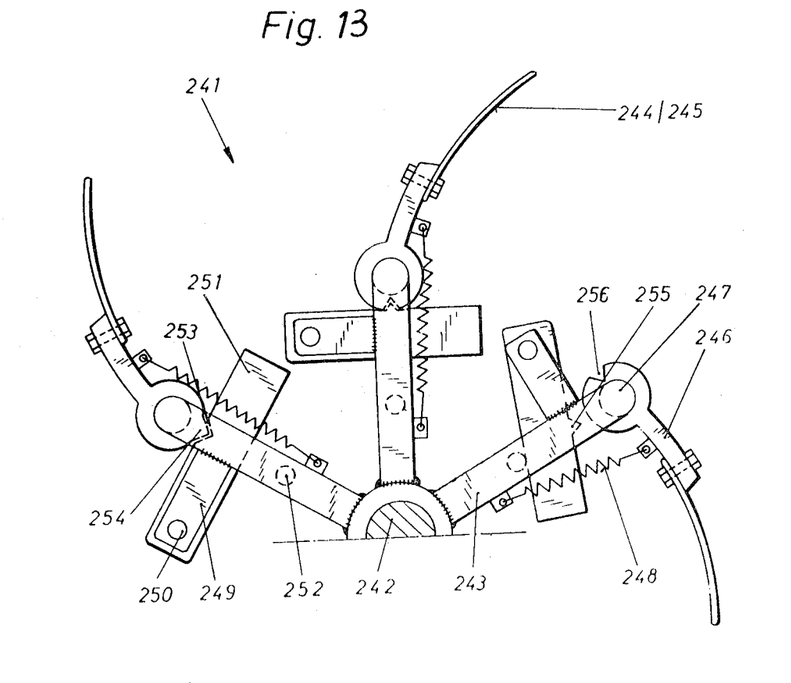
FIG. 13 illustrates one half a hay machine wheel in which the stabilizing means are provided with flyweights.
Figure 14:
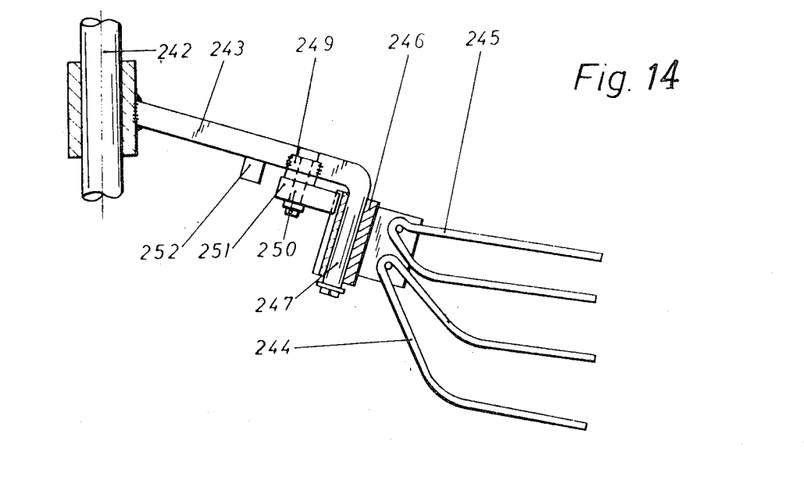
FIG. 14 is a partial sectional view of the wheel of FIG. 15.

The operating wheel 241 according to FIGS. 13 and 14 is provided for stabilization of the prongs 244 and 245 which are here formed as double spring prongs disposed above each other, with a flyweight 251. The upper prongs 245 serve as catch prongs. The flyweight 251 comprise plates which are journalled in an outwardly pivotable fashion on bolts 250, the bolts being set in lugs 249 fixedly secured with spokes 243 of wheel 241 rotatably supported on support 242.

In order to stabilize prongs 244 and 245 in their operating position which they assumed after they have been driven outwardly against the force of springs 248 by the centrifugal forces developed during the rotation of manipulating wheel 241, intermediate members 246 which are mounted on the downwardly directed end portions 247 of spokes 243, are provided with a projection 254 in the form of a cam, while the flyweight 251 has a recess formed therein 253, into which the cam 254 enters. As soon as prongs 244 and 245 and their associated intermediate members 246 are driven by their centrifugal forces from their rest position shown on the right side of FIG. 13 into their operating position shown in the left part of FIG. 13, the cams 254 enter the recess 253 of flyweight 251, whereupon a high stability is attained. If prongs 244 or 245 come upon an obstruction, they are capable of deflecting backwards inasmuch as the flyweights 251 are capable of sliding backwards. The invention also provides that projections 252 are formed on spokes 243 which provide a fixed rest position for flyweights 251. It is also possible that instead of the above described cam and recess structure, the projections or cams 255 can be provided on flyweights 251 which then should come into cooperation with corresponding recesses 256 on intermediate members 246 in the operation position.

Figure 15:
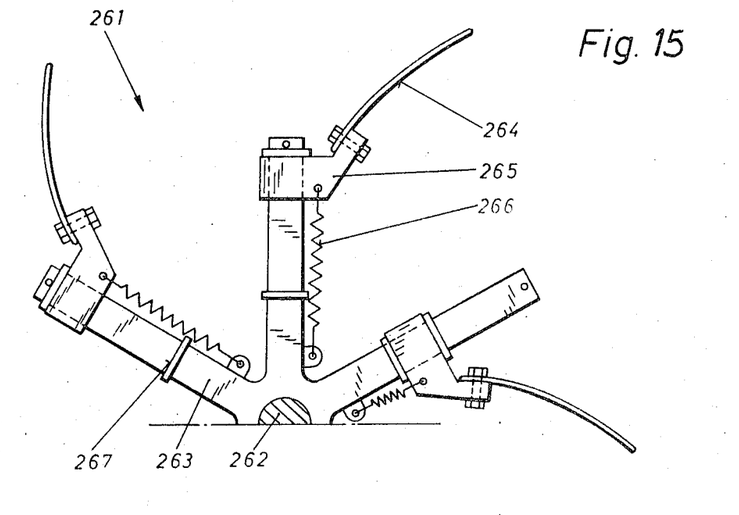
FIG. 15 is a hay machine wheel in which the prongs are arrested in operational position by being journalled on a sleeve.

In manipulating wheel 261 according to FIG. 15 which is again rotatably supported on a driving shaft 262 and which is formed with spokes 263, the operating prongs 264 are fixedly coupled to a sleeve 265. Sleeve 265 is slidably mounted on spokes 263 of wheel 261, in the particular embodiment, the spokes being rectangular in shape for illustrative purposes, and as shown on the right side of FIG. 17, the sleeves are kept in rest position by a spring 266 during which they are abutting against a projection 267. As soon as manipulating wheel 261 is set into rotation, the centrifugal forces will drive sleeves 265 against the force of springs 266 outwardly, so that prongs 264 assume their operating position in which they are arrested.

Figure 16:
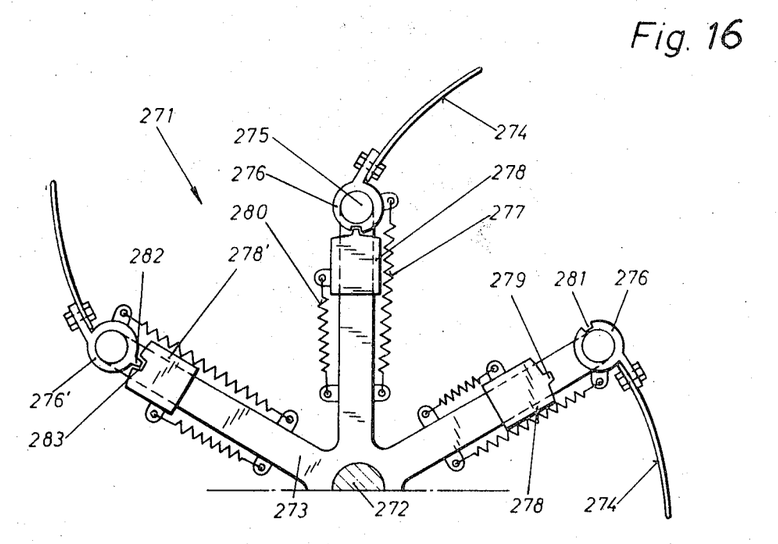
FIG. 16 is a hay machine wheel in a further embodiment similar to FIG. 15 in which the arresting of the prongs in operational position is performed by a slidable sleeve.

In manipulating wheel 271, according to FIG. 16, the prongs 274 are rotatably mounted on intermediate members 276 capable of rotating about the downwardly directed end portions 275 of spokes 273 which are formed as shafts, and held in rest position by springs 277, which with one end are connected to intermediate members 276, while with their other end are connected to the spokes 273. In order to arrest the prongs 274 in their operating position which they assume as being driven outwardly by the centrifugal forces during the rotation of the wheel and against the force of springs 280, sleeves 278 and 278' are provided in slidable mounting on spokes 273 in the following cooperation with intermediate member 276.

Sleeve 278 carries a projection 279 which in the operating position of prongs 274 enters a recess 281 provided in intermediate member 276. It is also possible, as seen in the left side of FIG. 16 that sleeve 278' is provided with a recess 283, while intermediate member 276 carries a projection 282 cooperating with recess 283. Should then wheel 271 set in rotation, then prongs 274 will be driven in their operating position outwardly and sleeve 278 and 278' are also driven outwardly and become coupled with intermediate members 276 and 270' so that the prongs 274 are arrested in such operating position.

Figure 17:
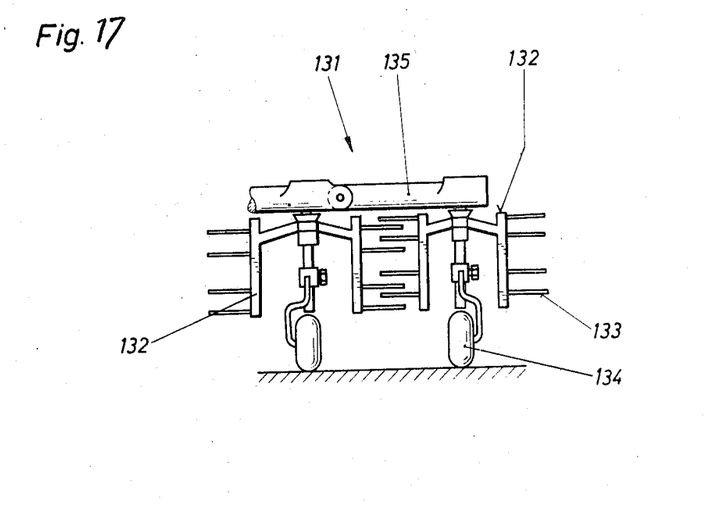
FIG. 17 is a schematic illustration of parts of a hay machine having hay treating wheels in overlapping comb-like fashion.

The hay manipulating machine 131 schematically illustrated in FIGS. 17 and 18 includes a plurality of operating wheels 132 which may be of the types described in connection with FIGS. 1 through 16. In this figure, in order to avoid crowding, the pivotable supporting of the prongs 132 is not shown. The operating wheels 132 which are supported from the ground by wheels 134 are further supported by a cross support 135 which in turn is connected to a tractor or driving machine by means of a pulling or towing shaft 136.

Figure 18:
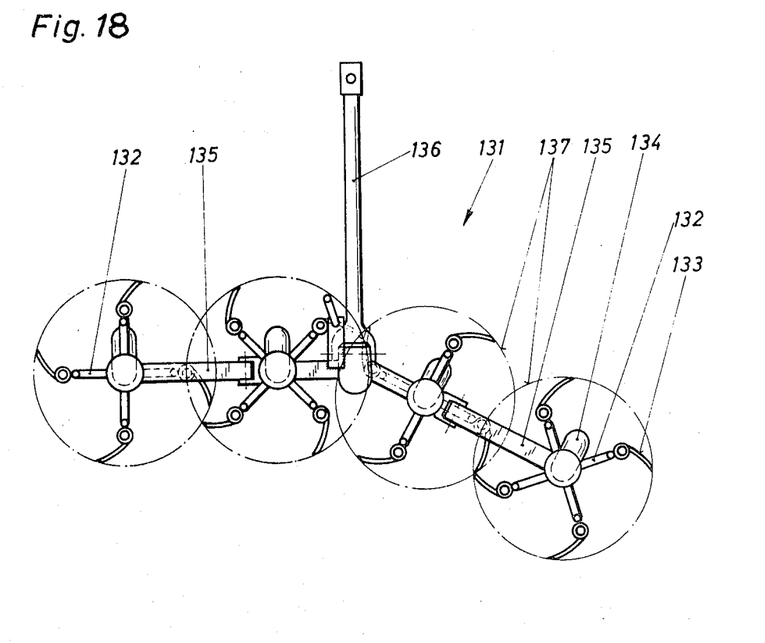
FIG. 18 is a top view of the hay machine according to FIG. 17.

The operating wheels 132 of a hay manipulating machine may, according to the invention, drive in the same or in the opposite sense and, as seen in the right half of FIG. 18, can be positioned directly next to each other or as seen in the left half of FIG. 18, they can be displaced with respect to each other on the tiltable cross support 135. According to the invention it is also provided that the operating wheels 132 can be positioned on the cross support 135 whereby the prongs 133 of adjacent operating wheels 132 enter each others region in a comb-like fashion or the circular paths 137 described by prongs 133 are tangential with each other or overlap each other. A hay manipulating machine 131 equipped according to the above provisions of the invention, is capable of performing a great variety of hay manipulating operations.

Although the foregoing description has been limited to particular embodiments of the invention, it will be obvious to those skilled in the art that changes and modifications may be made without departing from the invention, and therefore it is intended by the appended claims to cover all such changes and modifications that fall within the true spirit and scope of the invention.

I claim:

1. In a hay manipulating machine, a support wheel, a manipulating wheel supported from the ground by said support wheel and rotatable about an axis, operating prong means having a swung-in rest position and an operating swung-out position, coupling means movably coupling said prong means to said manipulating wheel and resilient means urging said prong means to assume said swung-in rest position when said manipulating wheel is at rest and permitting said prong means to assume said swung-out operating position by centrifugal force when said manipulating wheel is rotated about said axis.

2. The combination as claimed in claim 1, wherein said hay manipulating machine includes a plurality of manipulating wheels, adjacent ones of such wheels being driven in the same directional sense of rotation.

3. The combination as claimed in claim 1, wherein said manipulating wheel comprises a plurality of spoke means, said prong means being supported on said coupling means coupled to each of said spoke means, said resilient means comprises spring means associated with each of said spoke means and said prong means for retracting the associated prong means into said inoperative position.

4. The combination as claimed in claim 3, wherein an end portion of each of said spoke means comprises a shaft means, said coupling means comprising an intermediate member rotatably supported on said shaft means, said prong means being fixedly supported on said intermediate member.

5. The combination as claimed in claim 4, wherein said shaft means is an integral portion of said spoke means.

6. The combination as claimed in claim 3, wherein said manipulating wheel comprises a rim portion, shaft means fixedly secured to said rim portion, said coupling means comprises a first intermediate member rotatably supported about said shaft means, a second intermediate member, second shaft means rotatably coupling said second intermediate member to said first intermediate member, said prong means being carried by said second intermediate member, said coupling means further including means for adjusting said second intermediate member at a selected angular position with respect to said first intermediate member.

7. The combination as claimed in claim 4, wherein said shaft means coincides with an axis of rotation of said intermediate member, said axis being parallel with the axis of rotation of said operating wheel.

8. The combination as claimed in claim 4, wherein said shaft means coincides with an axis of rotation of said intermediate member, and axis forming an acute angle with the axis of rotation of said operating wheel.

9. The combination as claimed in claim 6, wherein said first shaft means coincides with the axis of rotation of said first intermediate member, said axis being parallel with the axis of rotation of said operating wheel.

10. The combination as claimed in claim 6, wherein said first shaft means coincides with the axis of rotation of said first intermediate member, said axis forming an acute angle with the axis of rotation of said operating wheel.

11. The combination as claimed in claim 3, wherein said spring means is secured at one end thereof to the spoke means and with the other end thereof to said coupling means, said prong means in said inoperative position being pulled in by said spring means inwardly toward said axis of rotation of said manipulating wheel.

12. The combination as claimed in claim 3, wherein said spoke means comprises shaft support means, a shaft fixedly secured in said support means, said coupling means comprising an intermediate member rotatably supported about said shaft, said shaft being disposed in an approximately perpendicular direction with respect to the axis of rotation of said manipulating wheel thereby permitting rotation of said intermediate member with the said prongs fixedly secured thereto in an upward direction away from the ground under the force of said spring means when said manipulating wheel is in its rest position.

13. The combination as claimed in claim 1, wherein said prong means have a flyweight associated therewith.

14. The combination as claimed in claim 3, wherein said coupling means comprises a first member including first shaft means, a second member carrying said prong means, second shaft means rotatably coupling said second member to said first member, said second shaft means being perpendicular with respect to the axis of rotation of said manipulating wheel, said first and second shaft means being movably secured to each other, said first shaft means being rotatably supported on said spoke means, the general direction of said first shaft being parallel with the axis of rotation of said manipulating wheel.

15. The combination as claimed in claim 14, wherein said second member includes a coupling rod coupling said spring means to said second member, said first member carrying a guide means having an upwardly directed guide surface, said coupling rod carrying said guide surface, said spring means forcing thereby said second member in an upward direction when said manipulating wheel is in its rest position.

16. The combination as claimed in claim 1, wherein said hay manipulating machine includes a plurality of manipulating wheels, the respective prong means of adjacent wheels entering the effective region of each other in a comb-like fashion in an overlapping relationship.

17. The combination as claimed in claim 1, wherein said hay manipulating machine includes a plurality of manipulating wheels, the prongs of adjacent wheels being tangentially directed to said wheel.

18. The combination as claimed in claim 3, wherein said operating prong means have associated therewith means for stabilizing said prong means in said operating position.

19. The combination as claimed in claim 18, wherein said stabilizing means includes flyweight means displaceably positioned when said manipulating wheel is in operating position, said flyweight means including a catch surface, said coupling means including an intermediate member having a surface cooperating with said catch surface in said operating position thereby arresting said prong means in said position during operation.

20. The combination as claimed in claim 18, wherein said stabilizing means comprises a projection on said prong means and guide means on said spoke means, said projection cooperating with said guide means.

21. The combination as claimed in claim 20, wherein said projection is curved rail means and said guide means is a bolt means adjustably positionable in a slot in said spoke means.

22. The combination as claimed in claim 18, wherein said stabilizing means is a curved rail means abutting against said spring means.

23. The combination as claimed in claim 18, wherein said stabilizing means is an adjustably positionable bolt means, said spoke means including flyweight means, said flyweight means including a portion abutting against said bolt means in said operating position.

24. The combination as claimed in claim 18, wherein said stabilizing means comprises a sleeve slidably supported on said spoke means and displaceably against the force of said spring means in said operating position.

25. The combination as claimed in claim 25, wherein said sleeve includes a catch surface, said coupling means including an intermediate member rotatably supported on a shaft portion of said spoke means, said intermediate member including a surface cooperating with said catch surface in said operating position thereby arresting said prong means in said position.

* * * * *